May 28, 1968

M. VIOS 3,385,392

ULTRASONIC SIREN APPLIED ON SEAGOING SHIPS
FOR DEFOGGING THE RANGES OF VISION

Filed Sept. 6, 1966

INVENTOR.
MICHALIS VIOS
BY
Mason, Fenwick & Lawrence
ATTORNEYS

INVENTOR.
MICHALIS VIOS
BY
Mason, Fenwick & Lawrence
ATTORNEYS

United States Patent Office 3,385,392
Patented May 28, 1968

3,385,392
ULTRASONIC SIREN APPLIED ON SEAGOING
SHIPS FOR DEFOGGING THE RANGES OF
VISION
Michalis Vios, ul. Traugutta 2a m4, Gdynia, Poland
Filed Sept. 6, 1966, Ser. No. 577,260
Claims priority, application Poland, Sept. 8, 1965,
110,777
6 Claims. (Cl. 181—.5)

ABSTRACT OF THE DISCLOSURE

An ultrasonic siren having concentric cylindrical rotors each having two groups of spaced holes positioned so that only one group on both rotors is alignable at any given time so that each group produces a sound wave of opposite polarity from the sound wave produced by the other group when the rotors are being driven by air turbines which exhaust to the interior of the rotors so that the air passes outwardly in pulses through the alternate groups of holes.

---

The object of this invention is the provision of a new and improved ultrasonic siren to be installed on the foremast of seagoing ships. The siren is constructed in such a way that it generates two ultrasonic waves similar to a stationary wave. The ultrasonic waves are of equal frequency and reverse phase and are radiated in the ship's direction of movement in the manner of a forwardly projecting light. The siren works by means of compressed air and causes the dispersion of fog particles by condensation of the water particles so that the fog is dispersed.

The siren has two turbines with rotors revolving in reverse direction and with one of the rotors being concentrically installed within the confines of the other rotor. Two groups of aligned holes are arranged throughout the periphery of each of the rotors to insure the constant flow of compressed air therethrough. In this way, rotation of the turbines is maintained and the periodical alignment of the group of holes in the respective rotors provide for the formation of two acoustic pressure waves in the form of two ultrasonic waves having the characteristics of a stationary wave.

The subject invention is employed for dissipating fog in front of a ship or in any other foggy location. While the use of single phase ultrasonic sirens have been attempted in connection with the dissipating of the fog around air fields, such uses have not proven to be satisfactory and have not brought forth satisfactory results. The high sound intensity required from such single phase sirens has caused physiological disorders of the personnel in the vicinity of the siren. The deficiencies of the prior art devices have been eliminated by the siren of this invention which does not require or provide the comparatively high sound intensity of the single phase sirens by virtue of the fact that the ultrasonic waves have the character of stationary waves. Moreover, the sound wave provided by the subject invention provides a high degree of fog dissipation as compared to the prior known devices.

In use, the instant invention is mounted on the foremast of a ship at a height of approximately eight meters above the deck. This height is sufficient to space the siren from the crew's quarters and deckhands a distance adequate to prevent any possible harm to the crew by the siren.

A preferred embodiment of the invention is illustrated in the drawings wherein.

Figure 1:
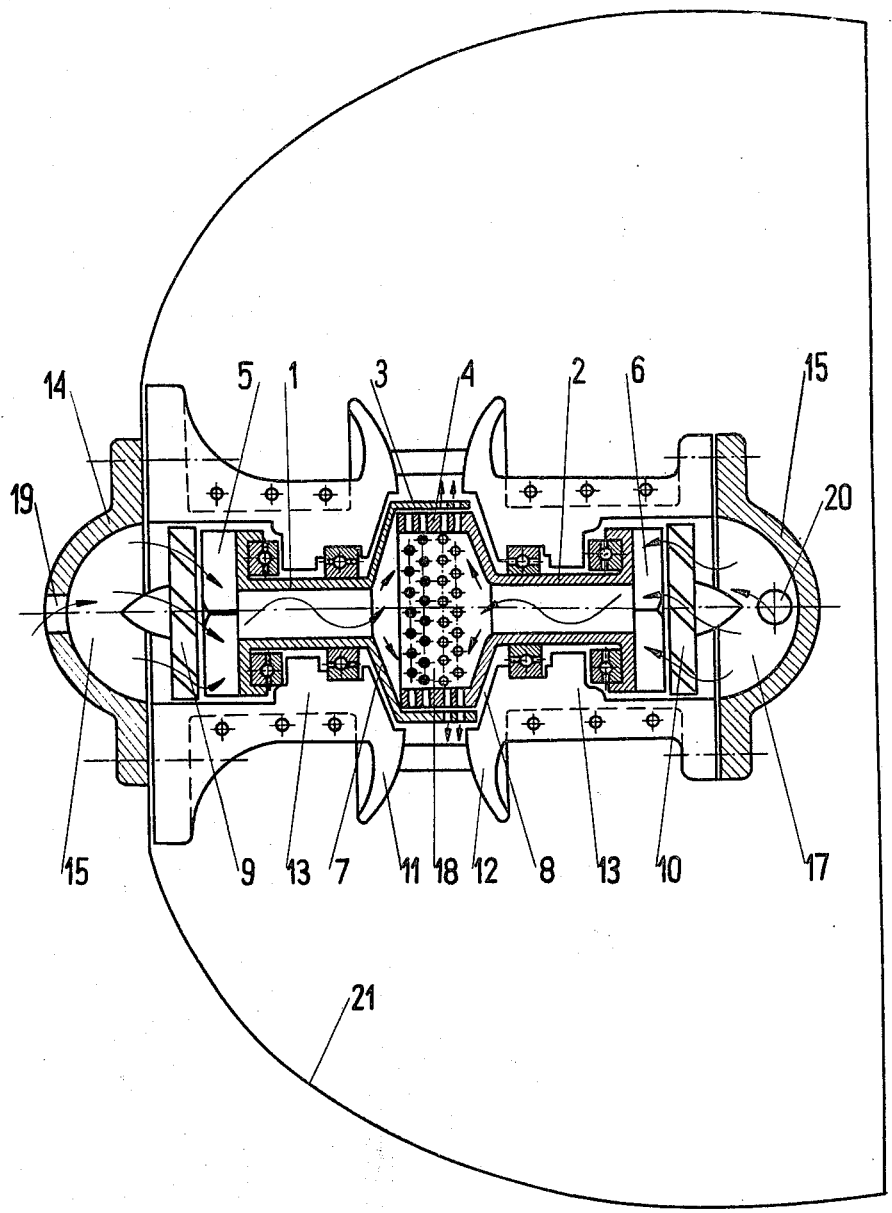
FIGURE 1 is a longitudinal bisecting sectional view of the preferred embodiment.
Figure 2:
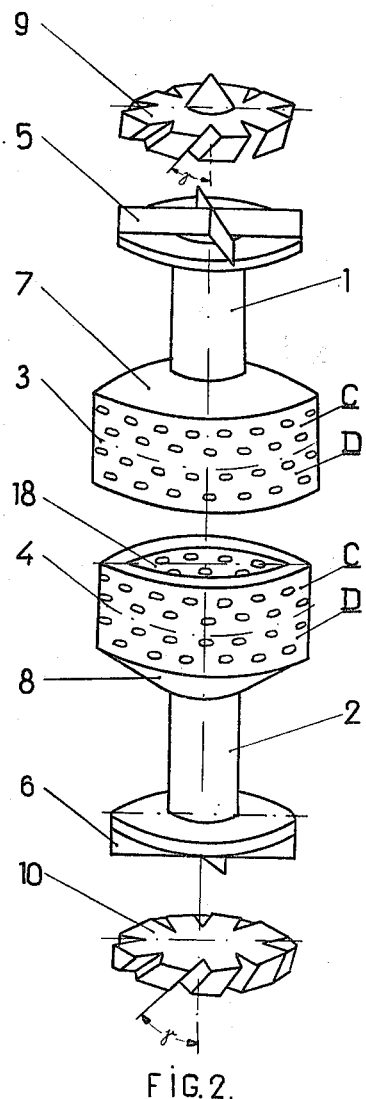
FIGURE 2 is an exploded perspective view of the interior elements of the preferred embodiment.
Figure 4:
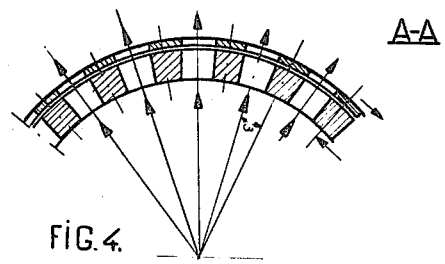
FIGURE 4 is an end sectional view of both rotors as viewed along the axis of both rotors.

The preferred embodiment of the invention comprises two turbines 5 and 6 having equal dimensions and installed in alignment on a common axis of rotation for driving in reversed directions by means of compressed air. The turbine 5 illustrated in FIGURE 1 of the drawings is formed on the end of a hollow support shaft 1 which is also illustrated in FIGURE 2. The turbine is formed with four blades in the shape of a cross as clearly shown in FIGURE 2. Similarly, the second turbine 6 is located on the right side of the device as illustrated in FIGURE 1 and is also supported for rotation by a hollow shaft 2 in the same manner as is turbine 5. A first rotor 3 is connected to the end of hollow shaft 1 opposite to turbine 5 and a second rotor 4 is connected to the end of hollow shaft 2 opposite to turbine 6. It should be noted that the rotors are connected to the ends of their respective hollow shafts by means of tapering portions 7 and 8. Rotors 3 and 4 are installed in concentric relation with respect to each other so that rotor 4 is located within the confines of rotor 3. The clearance between the rotors may vary up to .04 mm. and the rotors are therefore always free for relative rotation with respect to each other in reverse directions. Nozzle plates 9 and 10 are outwardly of the turbines 5 and 6 and each nozzle plate has eight nozzles spaced about its periphery and inclined to its axis at an angle between 50 degrees and 60 degrees. The entire construction is mounted within a casing 13 formed of two connectable parts. Casing end plates 14 and 15 are connected to the casing and serve as compressed air reservoirs for the siren. The members 14 and 15 are connected by ports 19 and 20 to a source of compressed air such as a compressor. The casing 13 is provided with outwardly flaring inverted portions 11 and 12 which in their lateral portions form the sound horn of the siren. The casing forms the body of the siren and is fitted inside a parabolic source reflecting mirror 21.

Compressed air flows from within the confines of members 14 and 15 through the nozzle plates 9 and 10 to revolve the respective turbines 5 and 6 in opposite directions. Air leaving the turbine plates passes inwardly into the interior of the hollow shafts 1 and 2 to a chamber 18 inwardly of the rotors 3 and 4. The flow of air through the preferred embodiment is illustrated by the streamlines in FIGURE 1.

Figure 3:
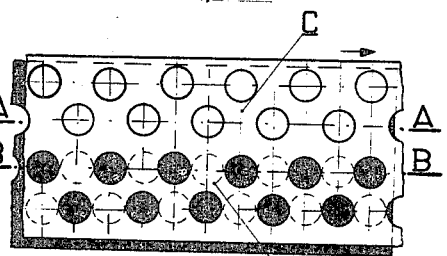
FIGURE 3 is an enlarged view of a portion of both rotors of the preferred embodiment as viewed perpendicularly to the rotor's axis.
Figure 5:
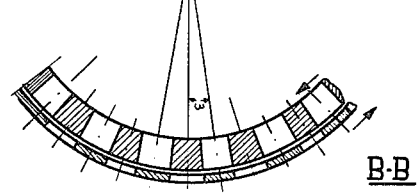
FIGURE 5 is a view similar to FIGURE 4 but illustrates the rotors in a different operative position with respect to each other.

The holes in each rotor are located in two groups C and D in parallel relationship along the rotor circumference. Each of the groups has holes located in two or more circumferential rows as shown in FIGURE 3. The diameter of the holes can be between 1.5 to 3 mm. The distance between adjacent holes along any given row is approximately the diameter of the holes in any given row. It should be noted that each rotor has both groups C and D as shown in FIGURE 2. The holes in each group on one rotor correspond to the holes of the same group on the other rotor. When the holes of group C on rotor 3 are in alignment with the holes of the same group on rotor 4, the holes of group D of both rotors are out of alignment as illustrated in FIGURE 3. When one group is completely open, the other group is completely closed and vice versa.

Figure 6:
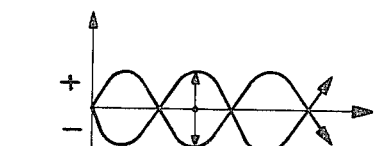
FIGURE 6 is a diagram of the ultrasonic waves produced by the subject invention.
Figure 8:
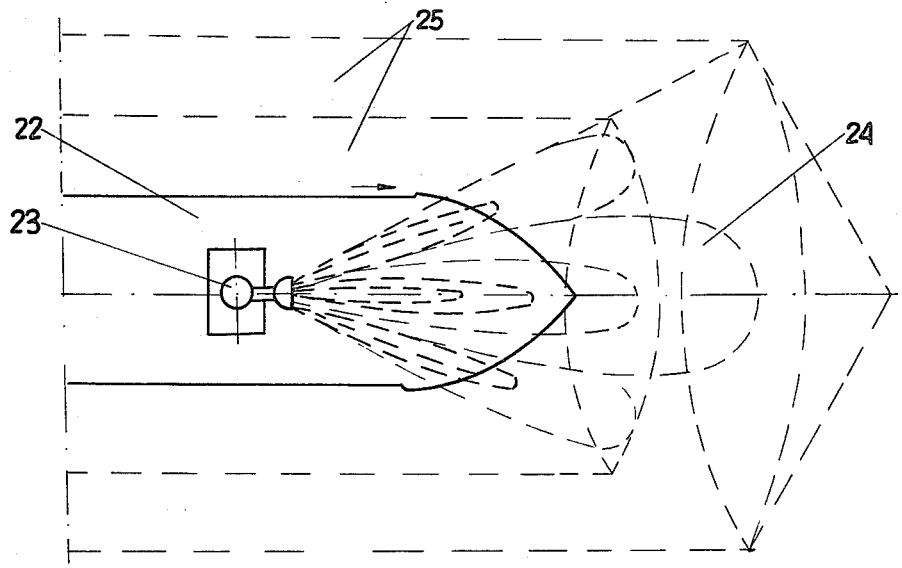
FIGURE 8 is a top view of the ship illustrated in FIGURE 7.

Relative rotative movement of both rotors in opposite directions through an angle corresponding to a segment of the rotor equal to the diameter of one hole opens the holes of one group and simultaneously covers the holes of the other group. Therefore, as the rotors are rotated, the output air is alternately pulsed through the holes of the two groups. Since there are two groups of holes with each group having the same number of holes which are equidistantly spaced, each group will produce an ultrasonic sound wave of the same frequency. However, the different waves produced by the different groups will be out of phase by 180 degrees. This fact is illustrated by the two wave forms illustrated in FIGURE 6 of the drawings. The combined waves have a characteristic of a stationary wave 25 illustrated in FIGURE 8 by way of explanation. The parabolic mirror 21 controls the direction of sound radiation in an obvious manner.

The frequency of the waves can range between 16,000 and 22,000 cycles per second for the most efficient fog dissipation. The frequency of the waves is controlled by controlling the speed of the turbine which is, in turn, controlled by the amount of air introduced thereto. Other variations can be made by controlling the angle of the nozzles through which air is introduced into the turbine.

The intensity of the sound emitted from the siren will vary for different sirens having different power requirements.

Figure 7:
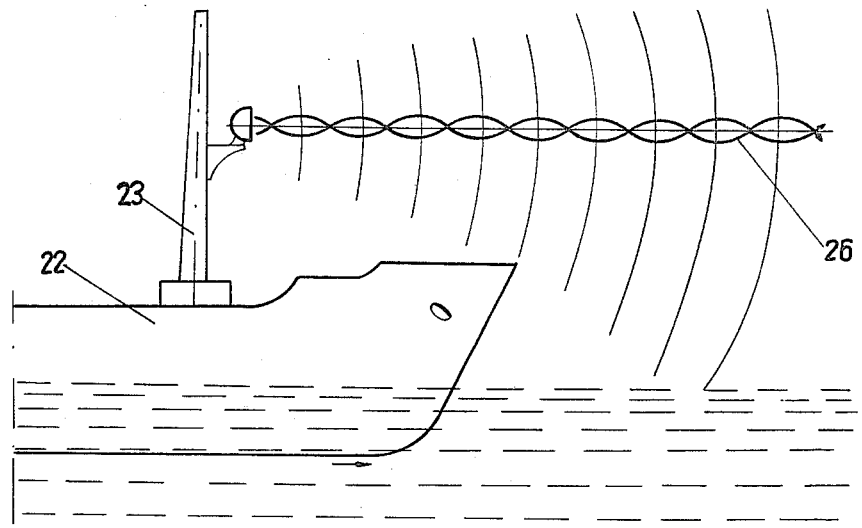
FIGURE 7 is a ship's profile showing the manner of mounting the subject invention on a ship.

The example illustrated in FIGURE 7 illustrates the siren mounted on the foremast 23 of a ship 22 at a distance of about 8 meters above the deck of a ship to radiate sound waves 26 in a forward direction as shown.

While other variations and modifications will be apparent to those skilled in the art, it should be understood that the scope of this invention is defined solely by the appended claims.

I claim:

1. An ultrasonic siren comprising a casing, a first rotor mounted within said casing, a second rotor mounted in said casing in closely spaced coaxial relationship for relative rotation with respect to said first rotor, each of said rotors having a first group of holes extending therethrough and a second group of holes also extending therethrough with the first group of holes on the first rotor being positioned in alignment with the corresponding first group of holes on the second rotor so that all of said holes of said first group on said first rotor are alignable with the corresponding holes of said first group on said second rotor and with the holes of said second group on each rotor being positioned in a similar manner to be alignable with respect to each other by relative rotation of said rotors wherein said first and second groups of holes are positioned on each rotor so that the holes of one group on both rotors are aligned with each other while the holes of the other group on both rotors are not aligned and are blocked by solid portions of the rotors, means for drivingly rotating said rotors with respect to each other, and means for supplying pressurized gas to said second rotor so that said gas alternately flows through the holes of each group of holes in said rotors so that the alternate gas flow through said groups produces first and second sound waves of reversed polarity to provide the effect of a stationary wave.

2. The invention of claim 1 wherein said rotors are of cylindrical shape and said second rotor is supported within the confines of said first rotor.

3. The invention of claim 2 wherein said rotors are connected to one end of respective first and second rotatably mounted hollow shafts with said hollow shafts forming a portion of said means for supplying pressurized gas.

4. The invention of claim 3 wherein said means for drivingly rotating said rotors includes turbine means attached to the end of said hollow shafts opposite to the end to which said rotors are attached and pressurized gas nozzle means for supplying motive gas to drive said turbines with the gas flowing from said hollow shafts to the interior of said second rotor to exit through said holes in said rotors.

5. The invention of claim 4 wherein said casing is mounted in a parabolic sound-reflecting mirror.

6. The invention of claim 4 wherein the circumferential spacing of adjacent holes of each group of holes is approximately equal to the diameter of said holes.

References Cited
UNITED STATES PATENTS

| | | |
|---|---|---|
| 1,866,019 | 7/1932 | Eshbaugh _____ 116—147 |
| 2,414,495 | 1/1947 | Vang. |
| 2,514,129 | 7/1950 | Horsley et al. |
| 2,730,067 | 1/1956 | Schaufler. |
| 3,089,458 | 5/1963 | Dory. |

BENJAMIN A. BORCHELT, *Primary Examiner.*

G. H. GLANZMAN, *Assistant Examiner.*